United States Patent
Ruban et al.

(10) Patent No.: US 7,203,190 B1
(45) Date of Patent: Apr. 10, 2007

(54) METHOD AND APPARATUS FOR ROUTING IN A COMMUNICATION OR DATA NETWORK, OR IN A NETWORK OF COMMUNICATION AND DATA NETWORKS

(75) Inventors: Thomas Ruban, Ottobrunn (DE); Alfons Puhl, München (DE); Jochen Grimminger, München (DE); Martin Bokaemper, Poxdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/343,859

(22) Filed: Jun. 30, 1999

(30) Foreign Application Priority Data

Oct. 1, 1998 (DE) ............................... 198 45 331

(51) Int. Cl.
*H04L 12/66* (2006.01)
*H04L 12/28* (2006.01)

(52) U.S. Cl. .............. 370/356; 370/389; 370/392; 370/395.42

(58) Field of Classification Search ............... 370/400, 370/401, 231, 389, 235, 238, 237, 247, 248, 370/252, 253, 352–356, 392, 395.1, 395.21, 370/395.32, 395.5, 395.52, 410, 420, 522, 370/395.2; 379/114.02, 114.08, 114.01
See application file for complete search history.

(56) References Cited

U.S. PATENT DOCUMENTS

| | | | | |
|---|---|---|---|---|
| 5,339,316 A * | 8/1994 | Diepstraten | ................ | 370/401 |
| 5,610,910 A * | 3/1997 | Focsaneanu et al. | ........ | 370/351 |
| 5,729,689 A * | 3/1998 | Allard et al. | ................ | 707/10 |
| 5,757,784 A * | 5/1998 | Liebowitz et al. | .......... | 370/321 |
| 5,828,665 A * | 10/1998 | Husak | ................... | 370/395.31 |
| 5,991,301 A * | 11/1999 | Christie | .................. | 370/395.3 |
| 6,145,002 A * | 11/2000 | Srinivasan | .................. | 709/225 |
| 6,147,995 A * | 11/2000 | Dobbins et al. | ............ | 370/392 |
| 6,157,636 A * | 12/2000 | Voit et al. | .................... | 370/353 |
| 6,188,683 B1 * | 2/2001 | Lang et al. | ................. | 370/352 |
| 6,256,671 B1 * | 7/2001 | Strentzsch et al. | .......... | 709/227 |
| 6,292,657 B1 * | 9/2001 | Laursen et al. | ............. | 340/7.2 |
| 6,292,833 B1 * | 9/2001 | Liao et al. | .................. | 709/219 |
| 6,393,481 B1 * | 5/2002 | Deo et al. | ................. | 340/522 |
| 6,430,619 B1 * | 8/2002 | Sitaraman et al. | ......... | 709/217 |
| 6,597,686 B1 * | 7/2003 | Smyk | ......................... | 370/352 |

FOREIGN PATENT DOCUMENTS

| | | |
|---|---|---|
| CA | 2227474 C | 2/1997 |
| CA | 2216337 A1 | 4/1998 |
| WO | WO 98/41043 | 9/1998 |

* cited by examiner

*Primary Examiner*—Chi Pham
*Assistant Examiner*—Melanie Jagannathan
(74) *Attorney, Agent, or Firm*—Laurence A. Greenberg; Werner H. Stemer; Ralph E. Locher (57) ABSTRACT

A method for routing data packets in a network analyzes data packets in the network with a selected network node. The path of the data packets to a destination address is manipulated in accordance with certain requirements. Information contained in the data packets as well as further information which is available to the network node is used for a routing. The further information can either be called up from a database of the network node or from a plurality of tables, which may be distributed in the network. A transfer node, such as a switching service, which is suitable for the requirements is determined. An apparatus for routing data packets in a network is also provided.

36 Claims, 6 Drawing Sheets

METHOD AND APPARATUS FOR ROUTING IN A COMMUNICATION OR DATA NETWORK, OR IN A NETWORK OF COMMUNICATION AND DATA NETWORKS

BACKGROUND OF THE INVENTION

Field of the Invention

The invention relates to a method for routing in packet-oriented communication and data networks.

A provider of an information service makes information available to users in a packet-oriented network. This information can be in the form of, for example, database contents or web sites and can be processed or searched through. In order to allow an information service to be used, a user generally has to use a switching service. This switching service switches data packets in the packet network, and thus produces access to the information service.

At the moment, a user can select between various switching services. He can use only one switching service at a time, and all the data packets are sent to this switching service, which then distributes them further. A new data connection must be set up when a change in the connection to a packet-oriented data network is performed, for example to an information provider (such as Compuserve or AOL) or to a corporate network.

If a user is not on the network to which he wishes to gain access, then he must first have a connection to a switching service. This is done, for example, at the user's PC (Personal Computer) at home using a modem via a line-switched telephone network and using a special protocol, such as SLIP (Serial Line Internet Protocol) or PPP (Point-to-Point Protocol). If the user wants to change the switching service, then the user must end the connection that has been set up, and must set up a new connection to a next switching service. All the parameters set during the first connection are thus lost.

One special case of an access service is called Virtual PoP (Point of Presence). In this case, one switching service allows other switching services to use the same access point. Users of this second switching service are in this case not aware that they are at an "external" access point.

SUMMARY OF THE INVENTION

It is accordingly an object of the invention to provide a method and an apparatus for routing in a communication or data network, or in a network of communication and data networks which overcome the above-mentioned disadvantages of the heretofore-known methods and apparatuses of this general type. It is in particular an object to provide a possibility for a user with an existing connection to a packet-oriented data network to select between different providers of switching and information services, without having to match this connection to the respective service.

With the foregoing and other objects in view there is provided, in accordance with the invention, a method for routing in a network, which comprises receiving a data packet by a network node in a network; assigning a first piece of information contained in the data packet to a second piece of information available to the network node; determining, with the network node, a route for the data packet through the network by determining at least one further network node through which the route passes; and passing on the data packet to a next network node on the determined route to a destination address.

In accordance with another mode of the invention, the route of the data packet from the network node to a defined node is uniquely determined.

In accordance with yet another mode of the invention, at least one detail of a desired transmission is determined from the first piece of information contained in the data packet, the at least one detail being selected from a user (source address), a destination address, a service provider, a quality, costs, and/or a security.

In accordance with a further mode of the invention, the source address and/or the destination address are composed of a plurality of address components.

In accordance with yet a further mode of the invention, the data packet is sent to a specific entity in the network and the data packet is processed at the specific entity, if the destination address contained in the data packet is incorrect or unknown.

In accordance with another mode of the invention, a response data packet, sent in response to the data packet, is sent from the destination address to a source address through the further network node.

In accordance with a further mode of the invention, a source address in the data packet is changed by the network node on its way from the source address to the destination address.

In accordance with another mode of the invention, the step of changing the source address with the network node is reversed.

In accordance with a further mode of the invention, a corrected source address is entered with the network node in a response data packet, which is sent in response to the data packet, on its way from the destination address to the changed source address.

In accordance with yet a further mode of the invention, a network address translation is applied to the data packet and/or response packet.

In accordance with another mode of the invention, a further network having a plurality of access points is accessed by using only one of the plurality of access points at a time, the destination address being located in the further network.

In accordance with yet another mode of the invention, an information service is provided as the destination address, the information service being accessible by a user only after the user is registered, and further information services accessible to the user at one time are provided.

In accordance with a further mode of the invention, the data packet is encrypted.

In accordance with yet a further mode of the invention, details concerning a source address are provided in a central database, the details including a basic state relating to a usage authorization of services existing in the network.

In accordance with another mode of the invention, an unauthorized user is denied the use of a service provided in the network by sending a data packet of the unauthorized user to a specific entity in the network and generating an error message with the specific entity.

In accordance with a further mode of the invention, an unauthorized user is denied the use of a service provided in the network by generating an error message upon sending a data packet of the unauthorized user, and sending the error message to the unauthorized user.

In accordance with yet a further mode of the invention, an authorization for a user is provided for using services provided in the network for which the user is not registered, a data packet of the user is sent to a specific entity in the network, and an error message with the specific entity is generated.

In accordance with another mode of the invention, a user or a service provider is charged based on at least one the following criteria, time, volume, number of accesses, services used, type of data packets, and transmission quality, the at least one criterion being collected as information in the network node during a routing.

In accordance with yet another mode of the invention, the network includes a communication network or networks and/or a data network or networks.

With the objects of the invention in view there is also provided, an apparatus for routing in a network, comprising a processor for receiving, processing, and passing on data packets; a first storage operatively connected to the processor for storing supplemental information relating to at least one of a user and services existing in the network; a second storage operatively connected to the first storage for storing administration information; a mapper operatively connected to the first storage for determining a mapping of logic computer names on network addresses and vice versa; and a router operatively connected to the processor for determining a route for each of the data packets, on the basis of information gathered from the data packets and the stored supplemental information, the router determining at least one node through which the route passes.

In accordance with another feature of the invention, the router determines a unique path to an interchange point by a virtual connection.

In accordance with yet another feature of the invention, a server accessible by the first storage includes at least one of authentication data, access data, and charge data.

In accordance with a further feature of the invention, an interface is operatively connected to the first storage for modifying the supplemental information.

In accordance with yet a further feature of the invention, a helpdesk offers a help option to the user upon occurrence of an error during an access to one of the services in the network and sends a message with information about the error to the user.

In accordance with another feature of the invention, the helpdesk offers an alternative service upon the occurrence of the error during the access.

In accordance with yet another feature of the invention, a user interface is provided for implementing the access and/or the help option.

In accordance with a further feature of the invention, the user interface communicates through the use of a suitable protocol.

In accordance with yet a further feature of the invention, the processor is a routing engine, the first storage is a user management system, the second storage is a service management module, the mapper is a DNS proxy server, and the router is a routing information module.

In the case of the routing method according to the invention, all the data packets in the network are analyzed by a selected network node, and the path of the packets to the destination address is manipulated in accordance with the requirements. First information, which is contained in the data packet, is used in this case (by the user that may also be a program). Furthermore, second information is used for routing, which is available to the network node. The network node can either call up this information in its own database or else in a plurality of tables, which may even be distributed in the network. A transfer node which is suitable for the requirements (for example a switching service) is determined.

The user can thus select various switching and information services without having to clear the connection, which is visible to him, at any time. The method ensures that a suitable route is selected, for example, if the user requests increased security or, if the destination in a Corporate Network is intended to be accessed through a route exclusively through this Corporate Network.

The decision about the rest of the route of the data packet may be made, for example, using the following method:

1. the source address (or else the transmission or sender's address of the user, first information item) is determined from the data packet, 2. the source address is assigned to a user, 3. the providers of switching services or information services which are accessible to the user (second information item) are determined, 4. from those switching services which are accessible to the user, those are selected which offer transport of the data packet to the desired destination address, 5. further boundary parameters are determined (for example cost limits, minimum quality) from additional details in the data packet or from additional information which is assigned to the user and which can further limit the selection of the switching or information service, 6. from the selected switching services, those are picked whose boundary parameters best match those of the user, 7. the finally selected switching service is thus assigned destination addresses which can be accessed from the user profile in the database, for example by defining rules.

The packet can then be passed on either in accordance with an already known principle, for example with the aid of DNS (Domain Name Service) on the Internet, or as explained below.

The apparatus according to the invention contains:
- a device (routing engine) for receiving, processing and passing on data packets (Internet Protocol IP),
- a device for storing information relating to users and services (current user and service information),
- a device for processing the first information determined from the data packet and additional available second information about the subordinate routing options (hardware and software) from the routing engine, and third stored information relating to the user and services, (routing information module), which, as an interface to the routing engine, exchanges information and carries out conversions on the transferred information where necessary, wherein this information may contain details about charges, for example after the end of the connection or the end of a service, as well as route selection information such as rules, destination address, next network node and type of selected connection (for example PVC (Permanent Virtual Circuit), tunneling and so forth),
- a device for determining the mapping of logic computer names to network addresses (DNS Proxy Server),
- a device for administering the system (service management module), and
- further external devices for storing information relating to users (system management server), which can interchange data with the internal storage devices via communication protocols which are suitable for the transmission of administration data, for example RADIUS (Remote Authentication Dial-In User Service).

The above-listed devices may be embodied as hardware, as software, or as a combination of hardware and software.

The data packets are sent from the network element to an interchange point, which is defined. This is normally done on any routes, for example using a so-called tunnel for data packets via the network (such as with the aid of GRE, Generic Routing Encapsulation Protocol, PPTP, Point-to-Point Tunneling Protocol, or L2TP, Layer 2 Tunneling Protocol).

In one embodiment of the invention, the network node also defines the route to the defined node. This is advantageous since specific control criteria can only thus become effective, for example security criteria in order to prevent data packets from being passed through "external" networks. Such a data path may for example be a direct connection (Permanent Virtual Circuit, PVC, Switched Virtual Circuit, SVC). The route of the data packet can also be provided by an explicit path statement in each packet (logic channels in the case of an asynchronous transfer mode (ATM)). So-called "source routing" or also RSVP (Resource ReSerVation Protocol) is provided for this purpose in the case of TCP/IP, the RSVP being further described in the Request for Comments, RFC 2205 titled "Resource ReSerVation Protocol (RSVP)", by R. Braden, Ed., ISI, L. Zhang, UCLA, S. Berson, ISI, S. Herzog, IBM Research, S. Jamin, Univ. of Michigan, September 1997.

The additional information items contained in the data packet and analyzed by the network node may be of different types. In addition to specific statements relating to desired transfer and destination nodes, such additional information may also include specific path details. Furthermore, information is desirable about the source and destination of the data packet, and features desired by the user for data transmission, such as costs, quality, security, and speed. This information can be determined from the content (header) of the data packet, explicitly or else implicitly. These details may be used individually or else in combination for further processing.

The address information relating to the source and destination of a data packet may comprise a plurality of components (address components). These include, for example, TCP/IP addresses which can be extended and refined through the use of a detailed statement of a logic connection end point, the so-called port number. In the case of other types of addressing, an access point to a hardware device may also be controlled or actuated through the use of an address extension by a port number.

There are various reasons why a data packet cannot be passed on from the network node. On the one hand, the packets may be incorrectly addressed. For example, it may not have been possible for the DNS Proxy to resolve the stated address correctly, so that it is not possible to determine any destination address, and thus no next network node to which the data packet should be passed on can be determined.

On the other hand, the destination address may be correct, but it was not possible for the central network node to determine a switching service which can transmit the data packet to the desired destination address. A further error possibility is due to the fact that the users must first register with a switching service or information service. If the user selects a service for which he has not submitted a usage authorization, data packets can likewise not be passed on.

Data packets which cannot be passed on are, as a rule, deleted (discarded) in a packet-oriented data network.

In one embodiment of the invention, all these data packets which cannot be delivered are passed on to a suitable network node ("default"), or are transferred to a local process which then generates a reaction. This reaction may comprise, for example, an error message which is sent back to the sender and includes a statement of why delivery of the data packets was not successful (negative acknowledgement).

A further simple solution would be for the ICMP (Internet Control Message Protocol) to generate responses ("host unreachable").

This reaction may also include a help statement indicating how the error which has occurred in data transmission could be avoided (for example: registration with a switching service necessary, error in the address, and so forth). This information may in some circumstances be sufficiently comprehensive that at least one specific action is offered, or the option is offered to the user to select one of these actions, to reject them, or else to enter an alternative reaction.

Furthermore, in the case of an unclear requirement or request (several possible switching services are "equally good"), the switching service or information service selection can be achieved by the network node through the use of further questions.

Those data packets which are sent as response packets from the destination address back to the source address are intended to pass through the same defined node (that is to say the same switching service) as the original packets.

On the outward route and return route, it is thus also necessary for the entries of the source and destination addresses to be manipulated by the network node. In order to be able to assign arriving data packets clearly and uniquely as response packets, recordings are in this case stored via the (virtual) connections, in order to make it possible to change the possibly manipulated addresses once again. This corresponds to the methods known for IP data packets of Network Address Translation which are further described in the Request for Comment (RFC) 1631, titled "The IP Network Address Translator (NAT)", by K. Egevang, Cray Communications, P. Francis, NTT, May 1994. This covers, for example, Masquerading, DNAT (Distributed Network Address Translation), NAR (Negotiated Address Reuse) or RAT (in this context, see also Internet Drafts, for example at the domain "ietf.org" on the World Wide Web of the Internet).

The user (that is to say the sender of the original packets and the receiver of the response packets) can thus be sure that these data packets also correspond to the criteria desired by him. This applies to the transmission costs and the transmission quality in the same way as it applies to guarantee a transmission security level.

If the path for the return route with the source address of the original data packet is not known in the network, but the switching service can itself be accessed from "both ends" (sender and receiver, user and information service), then this can be used to induce the switching service to learn the route from the central network node using standard protocols.

In this way, every part of the transmission route for the data packet is defined, from the user to the switching service, from the switching service to the information service, and back again. If the route to the switching service from the central network node is intended to be dedicated for the messages, it is possible to use a NAT (Network Address Translator) to at least one different source address. This allows the switching service to access the central network node also on different routes. Furthermore, the central network node can also communicate directly with the basic network, and thus interchange route information.

In a further embodiment of the invention, the user is allowed to switch between different service providers during a connection to a second data network with the different data sources which can be accessed. In this case, the route is defined individually for each data packet. The user can select between individual switching services, but only one respective switching service is active for specific networks or information services. This is important, for example, for charging or billing. The switching services for Corporate Networks/Content Providers (generally networks) can be used in parallel.

In order to improve security, it is also possible for the data packets to be encoded by the user or by the network element (Service Gateway, SG) before they are sent, using the conventional encryption mechanisms. This is particularly advantageous if security-sensitive data packets are intended to be sent and the available data paths pass through external networks.

A user can register for various services (switching or information services) in the network, and then has a usage authorization for these services. Furthermore, depending on the nature of the service, additional transport characteristics can be specified for messages with attributes for the individual users (source address).

In this case, for example, different availabilities can be defined for a service as follows:

"hidden": the user is not able to use a service,

"unsubscribed": the user can use this service, but must register in advance,

"subscribed": the user has already registered for a service and can activate it from then on, and "activated": the user has currently opened access to the service.

Each user has a specific basic state with respect to the switching and information services. This basic state may also be called a user profile. The profile may be changed by the user during a session. This user profile can be stored in the central network element, although it is also possible to retrieve these user profiles from an external database (or a number of distributed databases) as required.

On the basis of this user profile, the central network element can quickly determine which user has authorization for which switching service. In the situation where the user is not allowed to use a switching service, the central network element can immediately pass a respective data packet to a suitable network node for error handling.

Access via the user profile can be protected by a password (login).

A situation, where a user cannot use a switching service because he has not yet registered there, can be handled.

In both cases, it is desirable to send a suitable notification to the sender of the data packets. This should include information about why correct transmission of the data packet has failed. In order to produce these error messages, the corresponding data packets (at least one of them) can also be passed on to a suitable network element, which carries out the further processing.

The error handling can be configured to be very user-friendly, for example with graphics interfaces and with user control, which also gives a feedback and indicates possible ways of overcoming the errors found. Through the use of a so-called helpdesk, the user can also be offered a help option after the data packets have been sent, which tells him the options and actions open to him.

Since the data packets all pass through the "routing engine", which is controlled by this one special network node, it is easy to carry out data gathering for the purpose of recording charges.

On the one hand, the user can in this case be charged for the use of the resources offered. On the other hand, the information gathered by the service providers may be used for charging.

In this case, the values normally used for this purpose relate to the volume of data or the duration of the connection (including the use of network resources) that exist for the transmission. Furthermore, charging can also be carried out on the basis of details about the services used, the number of data packets successfully transmitted, or other details.

A route must be defined in order to pass the data packets from the special network node (routing engine) to the defined node (interchange point or switching service). This can be done in various ways:

using methods of NAT (Network Address Translator), using "encapsulation", that is to say encapsulation of the data packets, for example using GRE (Generic Routing Encapsulation as described in RFC 1701, by S. Hanks, NetSmiths, Ltd., T. Li, D. Farinacci, P. Traina, Cisco Systems, October 1994), also used for "tunneling" as with the protocols PPTP (Point to Point Tunneling Protocol, Microsoft), or L2TP (Layer 2 Tunneling Protocol, an extension of the PPP Protocol), and using PVC (Permanent Virtual Circuit) or SVC (Switched Virtual Circuit)

In addition to the internally stored information relating to authentication, access, user profile, or charging in a database (for example UMS, User Management System), there may also be external databases which make information of this type available throughout the network. Since this is security-sensitive data, relatively stringent requirements relating to data security must be placed on the access protocol from the central network node to this external database. One access protocol which is suitable for this purpose is RADIUS (Remote Authentication Dial-In User Service, described in RFC 2138 by C. Rigney, Livingston, A. Rubens, Merit, W. Simpson, Daydreamer, S. Willens, Livingston, April 1997) or LDAP (Lightweight Directory Access Protocol, described in RFC 1777 by W. Yeong, Performance Systems International, T. Howes, University of Michigan, S. Kille, ISODE Consortium, March 1995).

In a further embodiment, the user himself can modify the information contained in the database, for example the user can change his user profile. An interface must be provided for this purpose, via which he can access the data using a suitable operator interface.

Many solutions are already known for this purpose. One option is the already widely used http protocol (hypertext transfer protocol) with the normal web browsers (Netscape, Mosaic, Microsoft Explorer and so forth) as the user interface. Modified versions of this protocol or other suitable protocols (for example IP V6, which can also be used for "Voice over IP") are also feasible. These are also feasible on other user terminals, such as mobile telephones (with or without electronic organizers, such as the NOKIA Communicator) or Palmpilots, which have a small memory capacity and a small operator interface.

A help machine for the user can also be accessed via this interface. This help machine can simplify a correct passing-on of data packets from and to the user, based on accessible information and further queries. The help option can be implemented in various configurations.

The major advantage of the invention is that the modular configuration allows the use of a large number of standard components (some in modified form). This simplifies and speeds up the implementation.

Although the invention is illustrated and described herein as embodied in a method and apparatus for routing in a communication or data network, or a network comprising communication and data networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
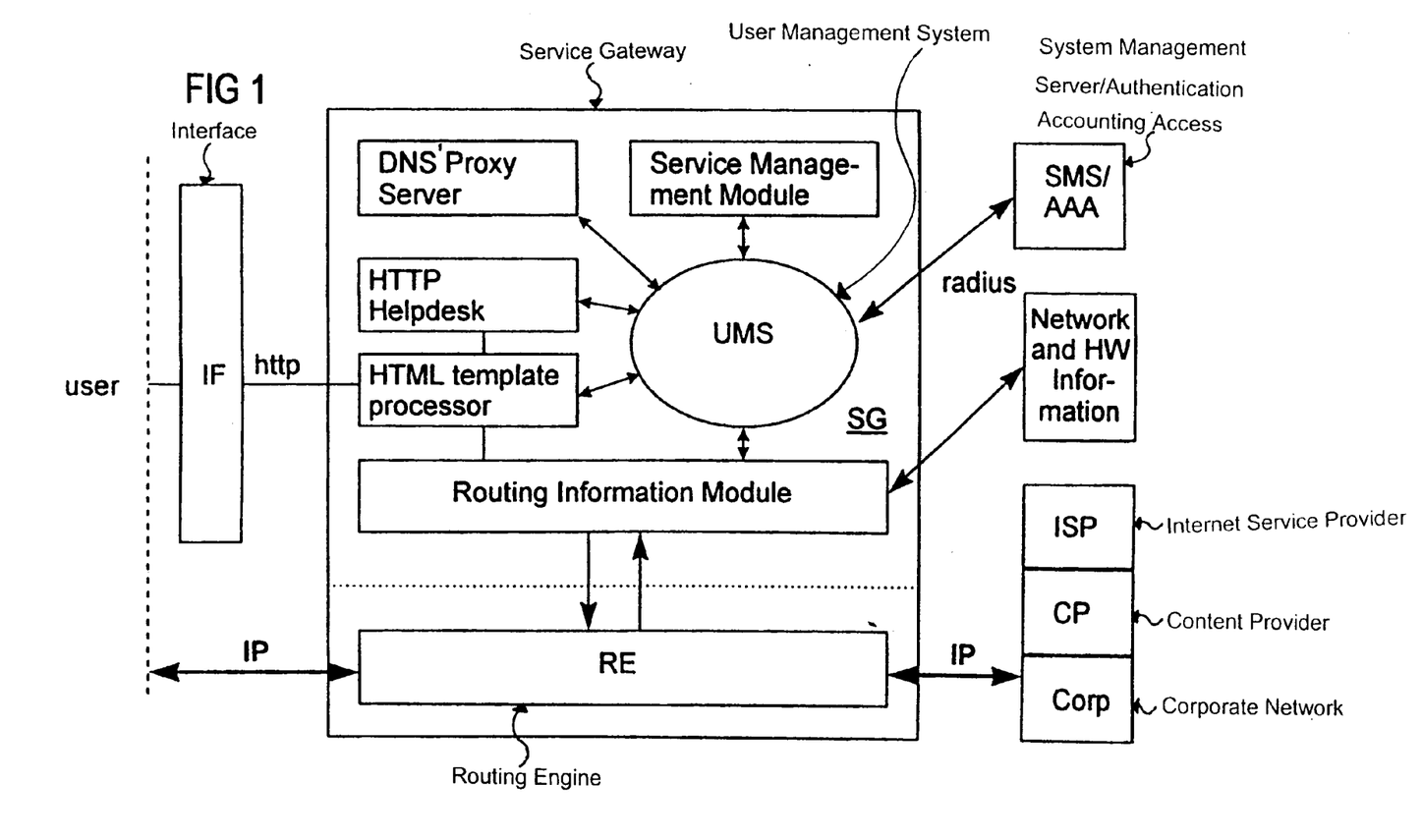
FIG. 1 is a exemplary schematic configuration of the apparatus for routing a data packet.

Referring now to the figures of the drawing in detail and first, particularly, to FIG. 1 thereof, there is shown an exemplary schematic configuration of an apparatus (SG) for routing a data packet (IP). The configuration does not show the minimum configuration, and various components are provided only to improve user-friendliness, but are not required per se for the operation of the apparatus. On the extreme left, there is a user or an application who or which produces or receives data packets and who or which wants to pass them on to the network. To do this, he or it transfers these data packets (IP) to a "routing engine" (RE) which has the task of receiving these data packets, processing them, and later passing them on in a suitable manner. The "routing engine" may be contained in the apparatus in various ways, for example in the core of an operating system (such as LINUX) or else as a separate "external" router.

This routing engine (RE) exchanges data with a device (routing information module) for processing first information, which is determined from the received data packets, second information relating to the user and services which can be selected from databases, and third information, which contains details relating to the hardware and software of the basic networks and routers being used. For example, rules are exchanged which have been determined from a user profile and regulate access to specific switching or information services. It may also be more detailed information relating to the use of protocols for further transmission of the data packets, such as NAT methods (RFC 1631). It may also relate to charge data.

The most important source for the second information is the memory (current user and service information, UMS (User Management System)). This is where the (current) user profiles are located which, for example, contain the rules and what is also required as information relating to users and services.

This information database can also be supplemented by one or more external memory sources (SMS, System Management Server), which supplies the required authentication information (authorization profile).

Communication may in this case take place through the use of RADIUS. RADIUS is a protocol for transmitting authentication, authorization and configuration information between a switching service which wishes to authenticate its connections and a (distributed) authentication server. The data which are stored in the User Management System (UMS) may also be edited by the users, in an extended embodiment. This is done via an interface (IF) which is generated, for example, by an HTML (hypertext markup language) "template processor", configured as JAVA Script ("Servlet", "Applet"). In this example, http and HTML are used for communication with the user, including a graphics operator interface such as Netscape. This improves user friendliness, but is not absolutely essential for the invention. Corresponding control commands may also be used when using a mobile telephone as a terminal.

DNS is required for addressing (logic name relating to the network address) the data packets in a packet-oriented network with TCP/IP. However, this may be an appropriate, different service in other networks. The DNS Proxy provided for this purpose in this case distributes arriving DNS requests, on the basis of the stored rules relating to users and services, to the actually responsible DNS Server in the network.

A further module which is not absolutely essential offers the user a help option (Helpdesk). In this case, it is expedient to use the same operator interface as for editing the information.

The help function may in this case be configured in a customary manner.

As soon as the data packet (IP) has been analyzed and processed in the described way, it can be passed on to the destination address. The destination may directly be an information service (CP, Content Provider) or may be in a Corporate Network (Corp).

If the data packet is intended to be sent to another communication network, then an interchange via a switching service (ISP, Internet Service Provider) is necessary.

Figure 2:
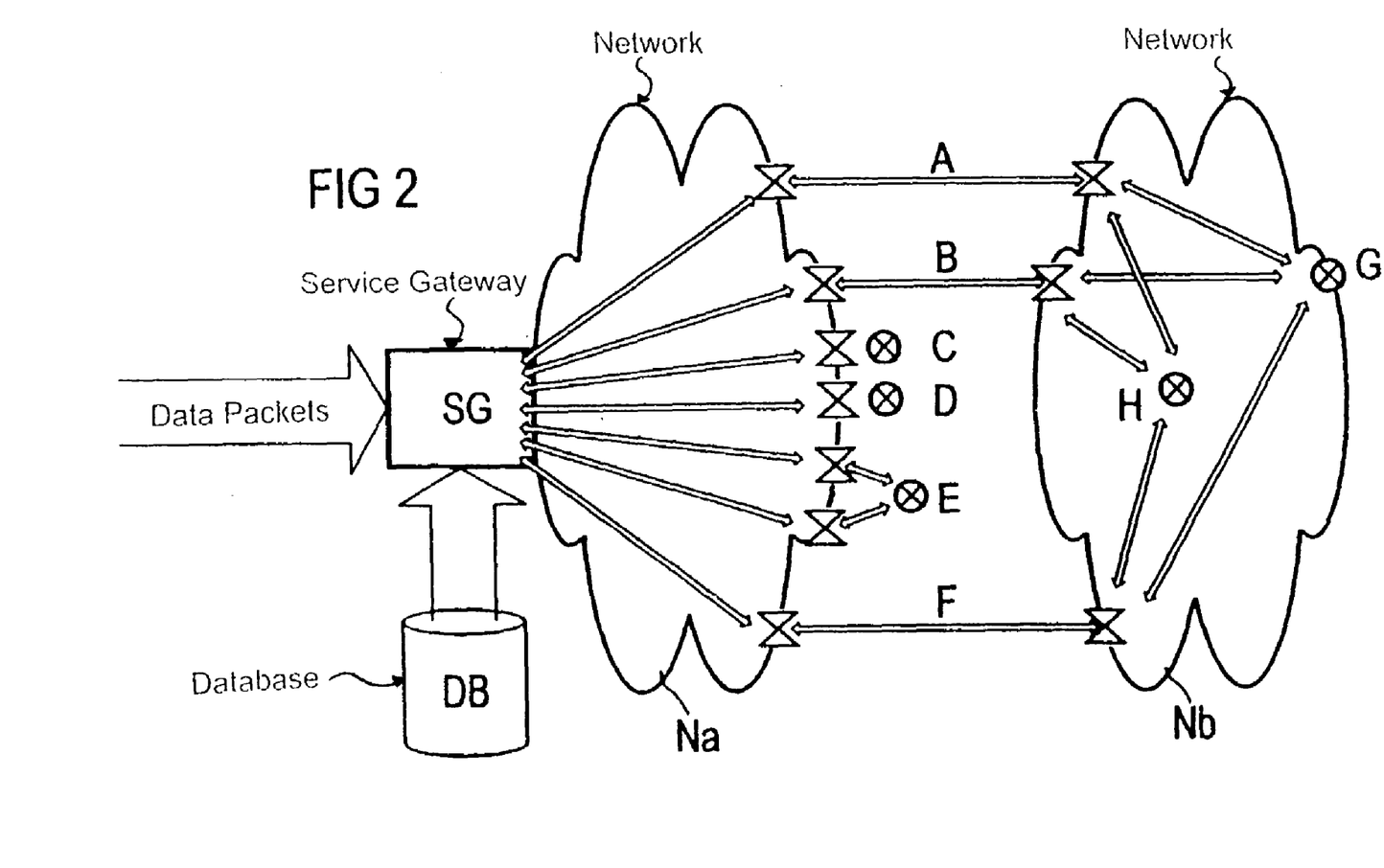
FIG. 2 is a schematic illustration of possible data paths between two separate communication networks with switching services and information services.

FIG. 2 shows a schematic layout of two data networks (Na and Nb) as well as a network element (SG) via which data packets are transmitted from users to one and/or the other data network, and the data paths which carry the data packets to the individual services.

The data packets are received by the network element (SG). The rest of the route in the first network (Na) is determined through the use of the already described method and additional information from a database (DB). The data packets may be passed on, for example by encapsulation, to one of the available switching services (A–F).

In this case, a distinction is drawn between services directly at the interchange point (information services, C–E) and services remote from the interchange point (A, B, F, also called an Internet Service Provider, ISP).

The switching services allow access to information services (G, H) in a second communication network (Nb). In this case, an information service can be accessed via a number of switching services (G, A, B, F), and one switching service can access a number of information services (A, G, H). Only one switching service can ever be activated to an information service at one time.

An information service can be accessed directly (C, D, E). More than one information service can be activated at one time.

Figure 3:
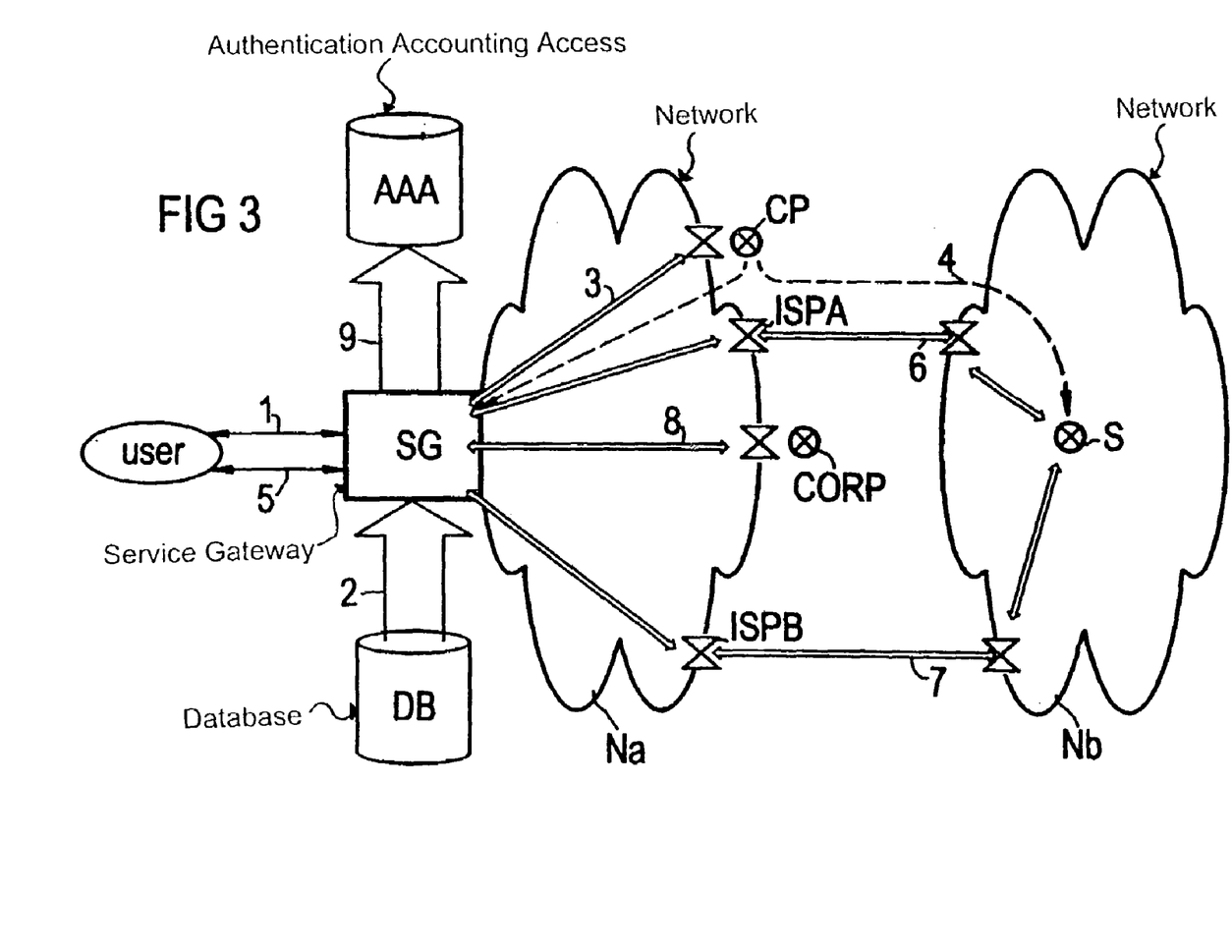
FIG. 3 is a schematic illustration of a communication network with a user's session.

Based on FIG. 2, FIG. 3 shows the sequence of a possible user "session".

A user accesses a network node (SG) via a network (for example a connection in a telephone network). This network node (SG) checks his user profile (2) on the basis of information from the transmitted data packets (1) and information contained in a database (DB).

His user profile does not contain any services which can be activated immediately, but a number of information providers that are freely available to all in any case.

The user interchanges data packets with one of these freely available services (CP, Content Provider), for example his bank (3). In our example, this may be information about his bank balance, credit transfer orders or the like.

If no user identification is required for the freely available service, then the user can dial in (anonymous login).

In the course of this data traffic, the user receives a number of interesting information items relating to, for example, web sites on the Internet. However, because, no switching service has been activated yet, this information service cannot yet be accessed by him (4).

The network element (SG) then gives the customer the option of selecting one service from a list of switching services (5).

The user decides to use a slow and cheap switching service (ISPA), after which data interchange is possible (6) with the information service (S) in the second communication network (Nb).

After some time, the user finds a relatively large document in the information service (S), which he would like to transmit. For this purpose, he changes to a switching service (ISPB) which is faster, but is more expensive (7).

During the changeover, the following changes are carried out:

the entry for the standard route for this user to the first switching service (ISPA) is deleted, the firewall rules which allow the data packets to use the route to the first switching service (ISPA) are deleted, if NAT methods have been used for the source address (IP) for the user to the first switching service (ISPA), then these rules are likewise deleted. (NAT is required for a chain of source-related passing-on operations. It is generally not used when using tunneling.)

new NAT rules are entered for the second switching service (ISPB), if required, new firewall rules are entered, in order to allow the data packets to use the route to the second switching service (ISPB), and a new standard route is entered for data packets from the user address to the second switching service (ISPB).

After this, he can start to copy the document.

During the copying process, the user would like to go back to a further information service (Corp), for example his company's internal network (8), in order to check his electronic mailbox there.

This can be done without any problems during the copying phase and, as soon as the transmission has ended, the user can also end the connection via the switching service (ISPB) while the connection to the Corporate Network (Corp) still exists.

Once the connection from the user has been cleared, the activations of the switching services are deleted and all the rules are removed by the network element and/or the routing engine (that is to say the activations of the individual switching services from its database).

Whenever use of a service ends and after clearing all the connections, all the information gathered relating to charging is transmitted (9) to a billing center (AAA).

Figure 4:
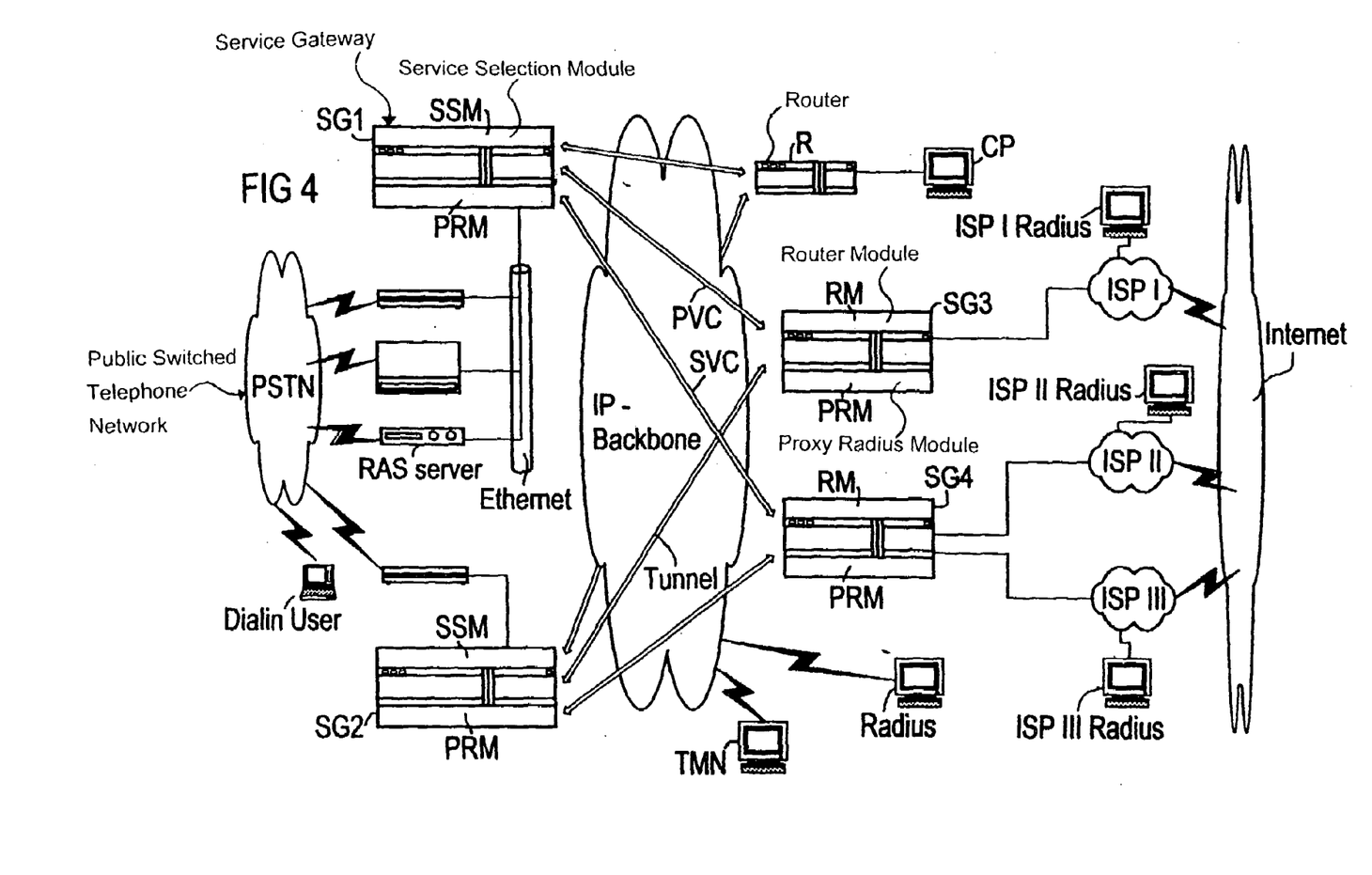
FIG. 4 is a detailed overview of an exemplary network with individual network components.

FIG. 4 shows an example of the configuration of a network of networks in which the user (dial-in user) can interchange data packets via various routes and switching services with a second communication network (Internet).

In this example, the user communicates via the telephone network (PSTN) through which he is connected, for example via a modem, to the PC.

The network element can also be used as a virtual PoP (Point of Presence, access point to the network). The transmitted data packets are passed on from the telephone network to the next network element (service gateway and/or routing engine). In this case, there are various options, for example via RAS (Remote Access Service) servers which are available from a wide range of manufacturers, such as 3Com, Cisco, or Ascend.

The data packets are passed on from there (for example using Ethernet or other transmission protocols) to the network element (SG1 or SG2) which uses information such as the user profile (SSM, Service Selection Module, PRM, Proxy Radius Module) to determine a route to an interchange point. As in this example, this route may pass via a packet-oriented network such as an IP-Backbone network. In this case, the data packets are passed on through the use of PVC, SVC technology, or else tunneling.

If the destination address is an information service or else a Corporate Network (CP, Content Provider), then the data packet can be passed on to that network directly via a suitable router (R).

If the intention is to use a switching service (ISP), then the data packet is transferred to a further network element or to a router (SG3, SG4). The rest of the route is determined by a router module (RM) in the network element. The exchange of authentication, billing and authorization data is performed for example using the authentication servers of the switching services (ISP x RADIUS, Authentication and Accounting).

Access to another network, such as the Internet, is then possible via the switching services (ISP I, ISP II, IPS III), and the data packets can be passed on. Charging and the gathering of further information, such as statistical data, can in this case be carried out by RADIUS servers associated with the switching services.

Independent RADIUS servers can also be attached to the IP Backbone to carry out, for example, the authentication and the charging for accesses to information services (CP) which are not passed via switching services (ISP). Furthermore, a network management (Telecommunication Management Network, TMN) may be provided. This can be carried out by the network operator companies.

In this case, connections can be administered and monitored when they access information and switching services with their specific user profiles.

The existing special network elements (service gateways) require various items of information, which should be configured jointly, in order to avoid inconsistencies. Depending on the size of the network and the number of special network elements (service gateways), the configuration complexity would then be very high.

Further information is required, for example, relating to addresses of tunneling devices relating to the services, addresses of the gateways relating to the backbone, addresses of RAS servers, addresses of network management systems (NMS) and system management systems, for user, charging and system-status information, information which is intended to be sent via SNMP (Simple Network Management Protocol), information which is intended to be sent via routing protocols, and security rules.

In addition, information is gathered relating to the services offered:

address area of the servers or networks which can be accessed,

URL (uniform resource locator) links to the service, information relating to the status of the service with regard to a user, DNS (Domain Name Service) server, if NAT is used, and much more.

Most information is identical on all special network elements, except for information relating to the specific network environment.

The network management can store this information centrally, and edit it using the normal mechanisms.

In order to monitor the system and its components, information such as the utilization level of a network node or the number of packets which are processed by a router can also with SNMP (Simple Network Management Protocol) be transferred to a network management system such as HP OpenView. A monitor can also be connected to a dedicated input provided for this purpose, in order to display such information.

Figure 5A:
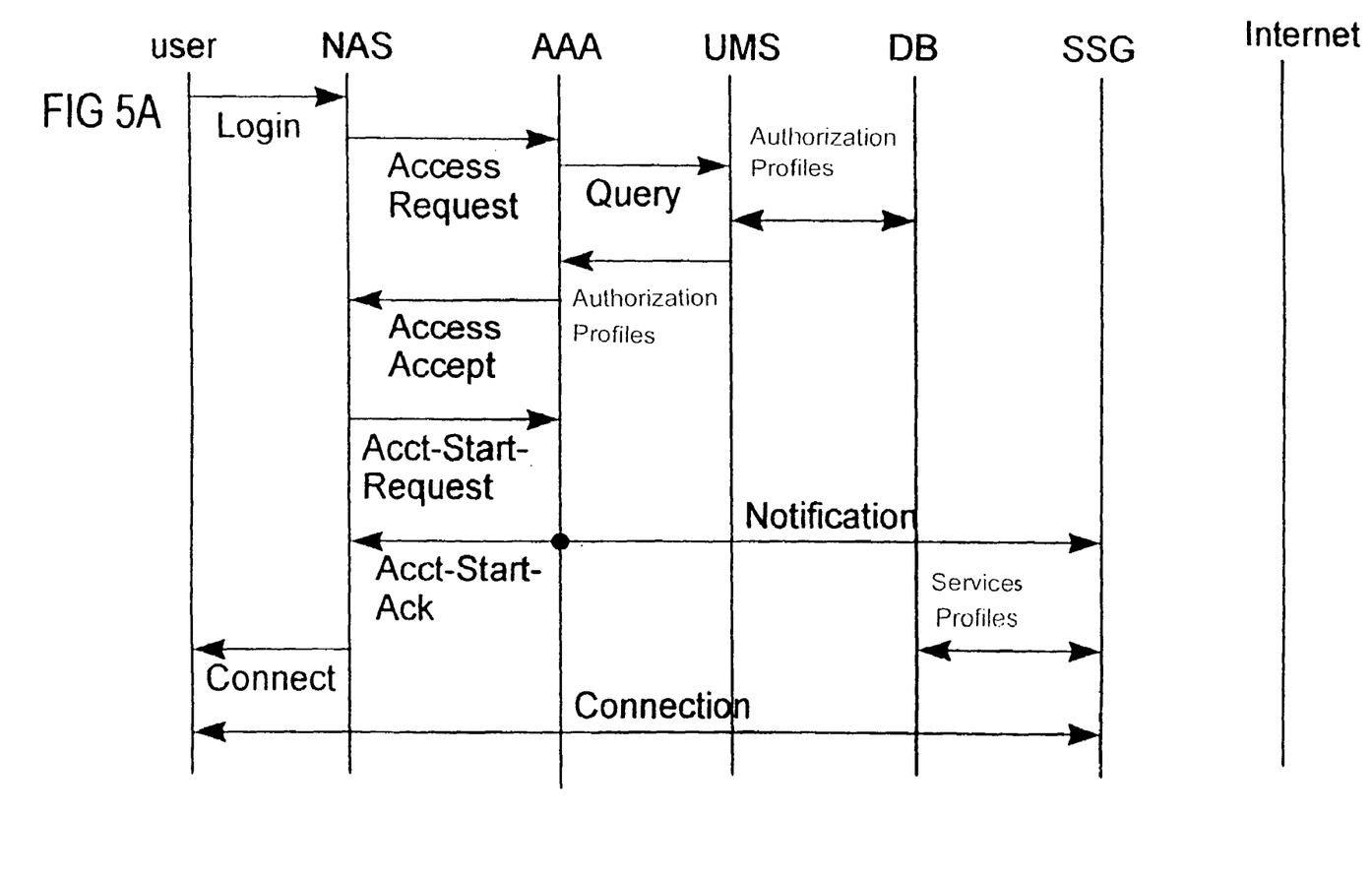
FIGS. 5a and 5b are flowcharts illustrating the interaction of the individual components of the apparatus, based on a simple scenario.
Figure 5B:
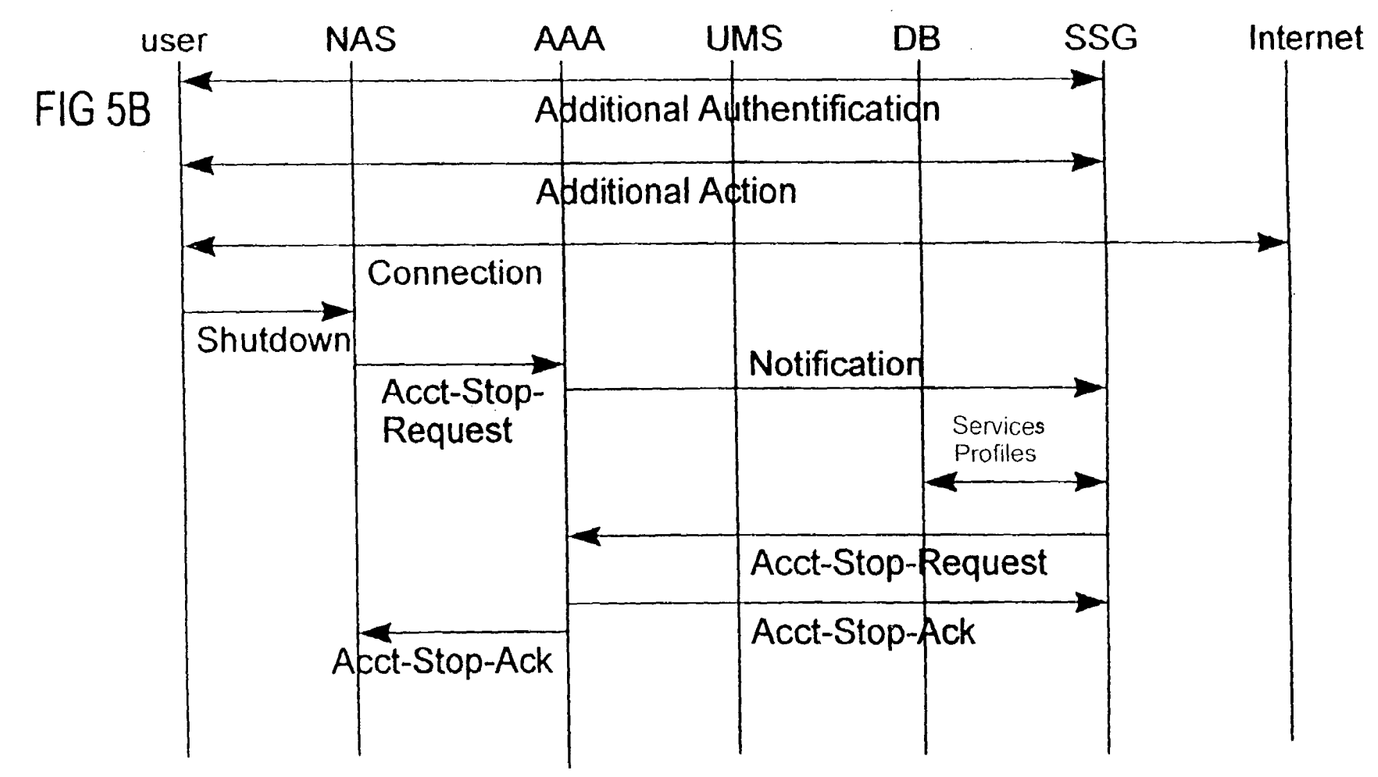

FIGS. 5a and 5b are flowcharts illustrating the interaction between the user and the individual components of the routing apparatus.

The user dials in to a network address translation server (Network Access Service, NAS) a via the telephone network (Public Switched Telephone Network, PSTN, Integrated Services Digital Network, ISDN). He sends his user identification (login Id) and a password.

If only a free service is intended to be used, an anonymous user identification may also be selected, without a password. The NAS service sends an access request, through the use of the RADIUS protocol, to a specific server (Authentication Accounting Access, AAA). The request contains the "login Id", the password and a caller ID.

The AAA server in turn queries a user management system (UMS) which has stored user information to verify the identity of the user (query). If the query is successful, a user profile (authorization profile) is returned to it. Otherwise, the AAA server is informed of the failure.

If the authentication is successful, the AAA server reports this to the NAS server (Access Accept) together with the authorization or authentication profile which is determined from the database and which may also include the network addresses (IP address) which have been assigned to it (transparent user).

If the authentication is not successful, this is likewise reported (Access Reject).

After successful authentication, the NAS server reports a number of other information items through the use of an "Acct Start Request" to the AAA server, such as the address, caller ID, session ID, and this signals the start of information recording, which is also used for charging.

At the same time, the AAA server informs the special network element (SG) of this information identifying the user (Notification). The AAA server sends an acknowledgement to the NAS server (Acct-Start-Ack).

The special network element (SG, SSG) stores the details relating to the services and users, which were returned in the user profile (service profiles). This list may also include other address details for future processing. These details are used to modify the rules for route selection (routing) in a suitable manner in the special network element. This allows the user to have access to the desired services (that is to say the user is registered or activated).

The services can be activated:
  while dialing in, when the first data packets from the user arrive, or
  when the user carries out an action (activation or deactivation of a service), or
  after access to a specific address or site ("hit").

Respective "Acct-Start" requests as well as respective "Stop-Ack" requests are sent in each case. The changes are all stored in the UMS server or in the database (DB).

In this way, a link is set up to the user, who now has access to the special network element, its data and those services which are activated and can be activated ("Connect").

If further information or authentication is required for these services, then this is carried out at this point in time, as is illustrated with the "Additional Authentication" step in FIG. 5b).

The user can also access services via the special network element. These services can be offered to him, for example through the use of an http web site by the network element, so that he need only select the appropriate link to this site, as is illustrated by the "Additional Action" step in FIG. 5b. Other rules from his user profile may be used in the process.

If this is necessary, a link to a network, in this case the Internet, is now opened or "allowed" via a suitable switching service.

The data packets are sent to their destination in accordance with the rules for route selection. In this case, recordings relating to the use of individual services may also be made by the special service element (SG).

If a connection is intended to be set up while connected to a second switching service, this can likewise be done by selecting the appropriate "links" on the "homepage". The configurations for the first service are removed, as described above, if the services which are entered for the new service are mutually exclusive. The recordings can be stopped and restarted at any time by the "Acct-Stop-Request" and the "Acct-Start-Request", when closing an old service and opening a new service.

As soon as the user clears the link (shutdown), for example by switching off his modem, the entries are cancelled or reversed again.

The NAS server detects the clearance of the connection and informs the AAA server (Acct-Stop-Request). This in turn informs the special network element (Notification), which then deletes the corresponding entries in its tables and writes the user and service profiles back to the database (DB), if anything has been changed. In order to end the recordings, an Acct-Stop-Request is transmitted and acknowledged for each active service (Acct-Stop-Ack). Finally, the NAS server likewise receives an acknowledgement. The AAA server ends the recordings and returns an acknowledgement (Acct-Stop-Ack).

Further information related to the invention is found in the Requests for Comments RFC 1055 having the title "Nonstandard for transmission of IP datagrams over serial lines (SLIP)" by J. Romkey, June 1988, and in the RFC 1171 with the title "Point-to-Point Protocol for the transmission of multi-protocoldatagrams over Point-to-Point links (PPP)", by D. Perkins, CMU, July 1990, as well as in the book "DNS und BIND" by Paul Albitz & Cricket Liu, first German edition, 1997, O'Reilley Publishers, in "Internet Engineering Task Force, Internet Draft", "Negotiated Address Reuse (NAR)" by G. Montenegro, Sun Microsystems, Inc., May 1, 1998, and "Internet Draft", "Distributed Network Address Translation" by Michael Borella, David Grabelsky, Ikhlaq Sidhu, Brian

We claim:

1. A method of routing in an Internet Protocol data network, which comprises:
  receiving a data packet originating from a calling user by a network node in the Internet Protocol data network;
  assigning a first piece of information contained in the data packet to a second piece of information available to the network node, the second piece of information relating to at least one of the calling user and services available to the calling user in the Internet Protocol data network;
  determining, with the network node, a route for the data packet through the Internet Protocol data network to a destination address within the Internet Protocol data network by determining at least one further network node within the Internet Protocol data network through which the route passes based on the second piece of information;
  passing on the data packet to a next network node on the determined route to the destination address within the Internet Protocol data network; uniquely determining the route of the data packet from the network node to a defined node of available nodes within the Internet Protocol data network; and
  upon receiving the data packet by the destination address, sending a response packet from the destination address to the calling user over the IP data network.

2. The method according to claim 1, which comprises determining from the first piece of information contained in the data packet at least one detail of a desired transmission selected from the group consisting of a user, a destination address, a service provider, a quality, costs, and a security level.

3. The method according to claim 1, which comprises composing at least one of a source address and the destination address of a plurality of address components.

4. The method according to claim 1, which comprises sending the data packet to a specific entity in the Internet Protocol data network and processing the data packet at the specific entity, if the destination address contained in the data packet is incorrect.

5. The method according to claim 1, which comprises sending the data packet to a specific entity in the Internet Protocol data network and processing the data packet at the specific entity, if the destination address contained in the data packet is unknown.

6. The method according claim 1, which comprises passing a response data packet, sent in response to the data packet, from the destination address to a source address through the further network node.

7. The method according to claim 1, which comprises changing a source address in the data packet with the network node on its way from the source address to the destination address.

8. The method according to claim 7, which comprises reversing the step of changing the source address with the network node.

9. The method according to claim 7, which comprises entering in a response data packet, sent in response to the data packet, on its way from the destination address to the changed source address a corrected source address with the network node.

10. The method according to claim 6, which comprises applying a network address translation to at least one of the data packet and the response packet.

11. The method according to claim 1, which comprises accessing a further network having a plurality of access points and the destination address located in the further network, by using only one of the plurality of access points at a time.

12. The method according to claim 1, which comprises providing an information service as the destination address, the information service being accessible by a user only after the user is registered in the service, and providing further information services accessible to the user at the same time.

13. The method according to claim 1, which comprises encrypting the data packet.

14. The method according to claim 1, which comprises providing details concerning a source address in a central database, the details including a basic state relating to a usage authorization of services existing in the Internet Protocol data network.

15. The method according to claim 1, which comprises denying an unauthorized user a use of a service provided in the Internet Protocol data network by sending a data packet of the unauthorized user to a specific entity in the Internet Protocol data network and generating an error message with the specific entity.

16. The method according to claim 1, which comprises denying an unauthorized user a use of a service provided in the Internet Protocol data network by generating an error message upon sending a data packet of the unauthorized user, and sending the error message to the unauthorized user.

17. The method according to claim 1, which comprises:
providing an authorization for a user for using services provided in the Internet Protocol data network for which the user is not registered;
sending a data packet of the user to a specific entity in the Internet Protocol data network; and
generating an error message with the specific entity.

18. The method according to claim 1, which comprises charging a user based on at least one criterion selected from the group consisting of a time, a volume, a number of accesses, services used, a type of data packets, and a transmission quality, the at least one criterion being collected as information in the Internet Protocol data network node during a routing.

19. The method according to claim 1, which comprises charging a service provider based on at least one criterion selected from the group consisting of a time, a volume, a number of accesses, services used, a type of data packets, and a transmission quality, the at least one criterion being collected as information in the network node during a routing.

20. The method according to claim 1, wherein the Internet Protocol data network includes at least one of a communication network and a further data network.

21. The method according to claim 1, which comprises:
receiving the data packet from a user who is not authorized for a requested service or action; and
providing a help desk for the user to get authorized for using the service or action.

22. The method according to claim 1, which comprises:
receiving the data from a user who is not authorized for requested services or action; and
providing a help desk for the user to get authorized to select various switching and information services or one of different service providers without having to clear a connection.

23. The method according to claim 1, which comprises:
determining a source information from the first piece of information from the data packet;
assigning the source information to a user;
determining providers of switching services or information services that are accessible to the user;
selecting from the switching services that are accessible to the user, those which offer transport of the data packet to a desired destination address;
determining further boundary parameters from additional details in the data packet or from additional information which is assigned to the user and which can further limit selection of the switching services or the information services;
picking from selected switching services, switching services whose boundary parameters best match those of the user; and
assigning finally selected switching services and destination addresses that can be accessed from a user profile in a database, and then passing on the data packet.

24. An apparatus for routing data packets of a calling user in an Internet Protocol data network, comprising:
a processor for receiving, processing, and passing on the data packets originating from the calling user;
a first storage operatively connected to said processor for storing supplemental information relating to at least one of a user and services existing in the Internet Protocol data network;
a second storage operatively connected to said first storage for storing administrative information;

a mapper operatively connected to said first storage for determining a mapping of logic computer names on network addresses and vice versa and for translating a logic computer name of the called user to a network address of the called user; and a router operatively connected to said processor for determining a route for each of the data packets received from a calling user, on the basis of information gathered from the data packets and the stored supplemental information relating to at least one of the calling user and the services available to the calling user in the Internet Protocol data network, said router determining at least one node through which the route passes.

25. The apparatus according to claim 24, wherein said router determines a unique path to an interchange point by a virtual connection.

26. The apparatus according to claim 24, including a server having access to said first storage including at least one of authentication data, access data, and charge data.

27. The apparatus according to claim 24, including an interface operatively connected to said first storage, said interface being configured to enable a user to modify the supplemental information.

28. The apparatus according to claim 24, including a helpdesk for offering a help option to the user upon occurrence of an error during an access to one of the services in the Internet Protocol data network and for sending a message with information about the error to the user.

29. The apparatus according to claim 28, wherein the helpdesk offers an alternative service upon the occurrence of the error during the access.

30. The apparatus according to claim 28, including a user interface for implementing at least one of the access and the help option.

31. The apparatus according to claim 30, wherein said user interface communicates through the use of a suitable protocol.

32. The apparatus according to claim 24, wherein said processor is a routing engine, said first storage is a user management system, said second storage is a service management module, said mapper is a DNS proxy server, and said router is a routing information module.

33. The apparatus according to claim 28, comprising a user interface providing an authorization of the user for using services provided in the Internet Protocol data network after occurrence of an error because the user is not registered.

34. The apparatus according to claim 28, comprising means for selecting various switching and information services or selecting one of different service providers without having to clear a connection.

35. A method of routing in an Internet Protocol data network, which comprises:

receiving a data packet originating from a given user in a network node of the Internet Protocol data network;

defining information contained in the data packet as a first piece of information, acquiring a second piece of information relating to at least one of the given user and services available to the given user in the Internet Protocol data network, and correlating the first and second pieces of information in the network node;

determining a route for the data packet through the Internet Protocol data network to a destination address within the Internet Protocol data network by determining at least one further network node through which the route passes based on the second piece of information;

passing on the data packet to a next network node on a uniquely determined route of the data packet from the network node to a defined node of available nodes within the Internet Protocol data network and to the destination address; and responding from the destination address by transmitting one or more data packets through the Internet Protocol data network to the calling user.

36. An apparatus for routing data packets from a calling user to a called user in an Internet Protocol data network, comprising:

a processor for receiving, processing, and passing on the data packets originating from the calling user;

a first memory device operatively connected to said processor for storing supplemental information relating to at least one of a user and services existing in the Internet Protocol data network;

a second memory device operatively connected to said first memory device for storing administrative information;

a mapper operatively connected to said first memory device for determining a mapping of logic computer names on network addresses and vice versa and for translating a logic computer name of the called user to a network address; and a router operatively connected to said processor for determining a route for each of the data packets, on the basis of information gathered from the data packets and the stored supplemental information each relating to at least one of the calling user and the services available to the calling user in the Internet Protocol data network, said router determining at least one node through which the route passes.

* * * * *